United States Patent
Fan et al.

(10) Patent No.: US 12,223,719 B2
(45) Date of Patent: Feb. 11, 2025

(54) APPARATUS AND METHOD FOR PREDICTION OF VIDEO FRAME BASED ON DEEP LEARNING

(71) Applicant: KOREA UNIVERSITY RESEARCH AND BUSINESS FOUNDATION, Seoul (KR)

(72) Inventors: Kun Fan, Seoul (KR); Chung-In Joung, Seoul (KR); Seungjun Baek, Seoul (KR); Seunghwan Byun, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 421 days.

(21) Appl. No.: 17/548,824

(22) Filed: Dec. 13, 2021

(65) Prior Publication Data

US 2022/0189171 A1    Jun. 16, 2022

(30) Foreign Application Priority Data

Dec. 11, 2020  (KR) ................. 10-2020-0173072
Dec. 29, 2020  (KR) ................. 10-2020-0186716

(51) Int. Cl.
  *G06V 20/40*   (2022.01)
  *G06N 3/08*    (2023.01)
  *G06V 10/82*   (2022.01)

(52) U.S. Cl.
  CPC ............ *G06V 20/46* (2022.01); *G06N 3/08* (2013.01); *G06V 10/82* (2022.01)

(58) Field of Classification Search
  CPC ..................................................... G06V 20/46
  See application file for complete search history.

(56) References Cited

U.S. PATENT DOCUMENTS

| 10,911,775 B1 * | 2/2021 | Zhu ................ H04N 19/46 |
| 2018/0253640 A1 * | 9/2018 | Goudarzi ............. G16H 50/20 |
| 2021/0064925 A1 * | 3/2021 | Shih ................ G06N 3/084 |
| 2021/0168395 A1 * | 6/2021 | Cricri ................ G06N 3/084 |

OTHER PUBLICATIONS

Fan, Kun et al. "Sequence-to-Sequence Video Prediction by Learning Hierarchical Representations" Applied Sciences 10, No. 22: 8288. 2020, https://doi.org/10.3390/app10228288, (14 pages in English).

Mukherjee, Subham, et al. "Predicting Video-Frames Using Encoder-Convlstm Combination." ICASSP 2019-2019 IEEE International Conference on Acoustics, Speech and Signal Processing (ICASSP). IEEE, 2019. pp. 1-5.

Papadomanolaki, Maria, et al. "Detecting Urban Changes With Recurrent Neural Networks From Multitemporal Sentinel-2 Data." IGARSS 2019-2019 IEEE international geoscience and remote sensing symposium. IEEE, arXiv:1910.07778v1 [cs.CV] Oct. 17, 2019, (5 pages in English).

* cited by examiner

*Primary Examiner* — Oneal R Mistry
*Assistant Examiner* — Jongbong Nah
(74) *Attorney, Agent, or Firm* — NSIP Law (57) ABSTRACT

An apparatus and a method of predicting a video frame are provided. The apparatus includes a level encoder configured to extract and learn at least one feature from a video frame, a feature learning unit configured to learn based on the at least one feature or transmit predicted feature data corresponding to the at least one feature, and a level decoder configured to obtain and learn a predicted video frame based on the predicted feature data.

12 Claims, 7 Drawing Sheets

APPARATUS AND METHOD FOR PREDICTION OF VIDEO FRAME BASED ON DEEP LEARNING

CROSS-REFERENCE TO RELATED APPLICATIONS

A claim for priority under 35 U.S.C. § 119 is made to Korean Patent Application No. 10-2020-0173072 filed on Dec. 11, 2020, and Korean Patent Application No. 10-2020-0186716 filed on Dec. 29, 2020, in the Korean Intellectual Property Office, the entire contents of which are hereby incorporated by reference.

BACKGROUND

Embodiments of the inventive concept described herein relate to an apparatus and method for prediction of video frame based on deep learning.

With the development of semiconductors and information processing technology, deep learning is attracting attention. Deep learning is a computer algorithm technology allow s computer device to perform a desired operation by learning a programmed neural network using a large amount of data. Recently, deep learning has been developed and employed in various technical fields such as natural language processing, video processing or restoration, character recognition, data mining, or data evaluation. With the development of deep learning technology, interest in technology for predicting future videos based on previously observed or acquired videos is also increasing. Using the videos prediction technology, several companies and research institutes are conducting research and thus various method for prediction have been proposed because it is possible to predict how the subject or background in the video will change in the future by analyzing the captured video. However, accurately predicting a future frame based on a given video is not easy to implement due to uncertainty of future events or unpredictability of spatio-temporal dynamics. For this reason, many of the previously presented prediction techniques lacked effectiveness because it was difficult to predict videos with high accuracy. In addition, the prediction techniques also have difficulties in that various information on changes in objects and motions in a video should be considered in advance. Accordingly, there are many obstacles in the conventional video prediction techniques to be applied to actual technical fields.

SUMMARY

Embodiments of the inventive concept provide an apparatus and method for predicting a video frame capable of performing video prediction more clearly, more accurately and more vividly.

According to an exemplary embodiment, an apparatus for prediction a video frame may include an N-level encoder that extracts latent representations from a video frame that has passed through N layers in a deep learning neural network, a feature learning unit that obtains predicted feature data trained based on the feature or corresponding to the feature, and an N-level decoder that obtains a predicted video frame based on the predicted feature data According to an exemplary embodiment, a method of prediction a video frame may include extracting latent representations from video frames that have passed through N layers in a deep learning neural network, obtaining predicted feature data trained based on the feature or corresponding to the feature; and obtaining a predicted video frame based on the predicted feature data.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Example embodiments of the present invention are described with reference to the accompanying drawings.

However, the scope of the claims is not limited to or restricted by the example embodiments. Like reference numerals proposed in the respective drawings refer to like elements.

Hereinafter, example embodiments of an apparatus for predicting a video frame will be described with reference to FIGS. 1 to 5.

Figure 1:
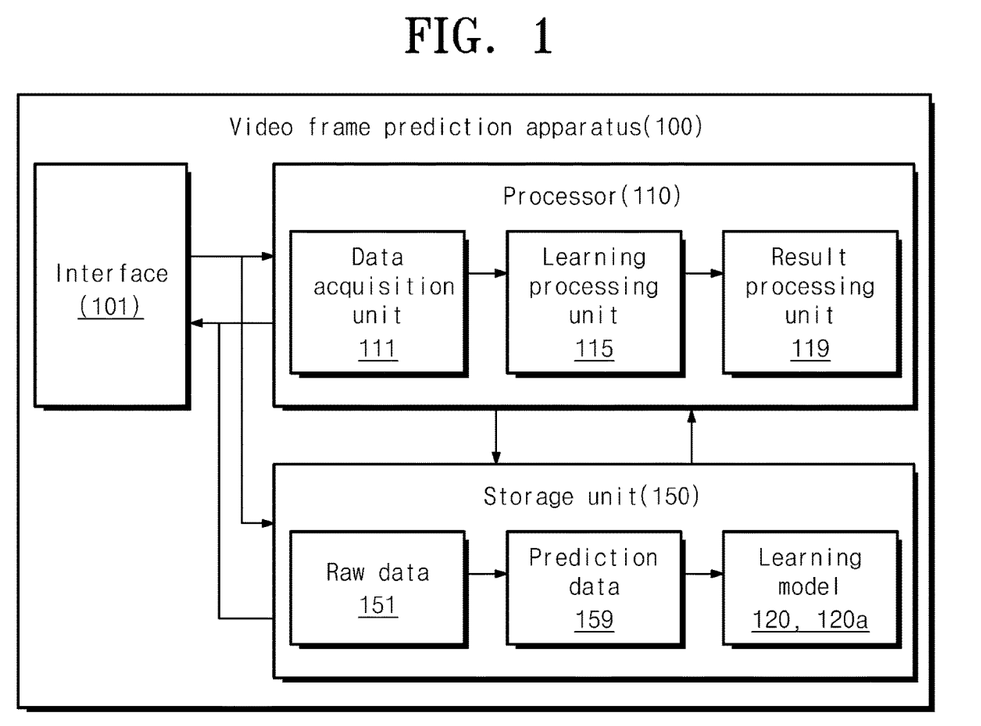
FIG. 1 is a block diagram of an apparatus for predicting a video frame according to an embodiment.

FIG. 1 is a block diagram of an apparatus for predicting a video frame according to an embodiment.

As shown in FIG. 1, a video frame prediction apparatus 100 may include a processor 110 and a storage unit 150 connected to the processor 110. The video frame prediction apparatus 100 may further include an interface 101 connected to at least one of the processor 110 and the storage unit 150.

The processor 110 may receive at least one raw data 151 for video prediction from at least one of the interface 101 and the storage 150, perform training on a learning model 120 based on the received at least one raw data 151, or input at least one raw data 151 to a trained learning model 120a, and thus obtain at least one piece of prediction data 159 corresponding to the at least one piece of raw data 151. Here, the raw data 151 may include at least one video frame "x", and the at least one video frame "x" may be a video frame "x" at one or more specific time points "t" ("t" is 0 or a natural number of 1 or more, but not limited thereto). At least one video frame "xt" may be a part of at least one moving picture, and in this case, a series of sequentially combined video frames "xi:T" may form at least one moving picture. Here, "i" may be an index for the start of a video, and "T" may be an index for a reference time. "i" may include 1, "T" may include the last value of the input video, and "T" may correspond to the length of the input video. The at least one prediction data 159 may include at least one video frame "ˆx" predicted from the at least one raw data 151, and specifically, may include a predicted video frame "ˆxt" corresponding to the frame "xt" of a specific time "t", which is the raw data 151. In detail, the prediction data 159 may include a prediction result (i.e., at least one predicted video frame (ˆx(T+1):(T+K)) for at least one video frame in the future (e.g., (T+1) time to (T+K) time point, where "K" is a natural number greater than or equal to 1) that will appear sequentially for a series of sequentially combined video frames "xi:T".

The processor 110 may include a data acquisition unit 111 and a learning processing unit 115, and may further include a result processing unit 119 as necessary.

The data acquisition unit 111 may acquire data, e.g., the raw data 151, required by the learning processing unit 115 from the interface 101 or the storage unit 150 and may transmit it to the learning processing unit 115.

The learning processing unit 115 may train the learning model 120 using the obtained raw data 151. In detail, the learning processing unit 115 may obtain the trained learning model 120a by applying the video frame x1:T or x1:(T−1) up to the reference time point "T" or the earlier time point (e.g., time point (T−1)) to the learning model 120. Also, the learning processing unit 115 may obtain the prediction data 159 corresponding to the raw data 151 by performing prediction by applying the raw data 151 to the trained learning model 120a. Here, the learning processing unit 115 may obtain a future video frame x(T+1):(T+K) (hereinafter, referred to as a predicted video frame) corresponding to the input video frame xT or x(T+1) by applying the video frame xT or x(T+1) of the reference time point "T" or a later time point (e.g., time point (T+1)) to the trained learning model 120a. At least one prediction data 159 obtained by the learning processing unit 115 may be transmitted to the storage unit 150 and then stored by the storage unit 150, or may be transmitted to the interface 101 and provided to a user. According to an embodiment, the learning processing unit 115 may perform both a training and a prediction process, or may perform only one of these processes. A detailed description of the learning processing unit 115 will be described later.

The result processing unit 119 may generate at least one data to be provided to a user or transmitted to an external information processing device (not shown) by using the prediction data 159 obtained by the learning processing unit 115. For example, the result processing unit 119 may generate at least one video data (e.g., a moving picture) by sequentially combining the video frames x(T+1):(T+K) predicted by the learning processing unit 115, and transmit it to the storage unit 150 or the interface 101.

In addition, the result processing unit 119 may generate information on how much the processing result (e.g., video frames acquired during training or prediction ˆx(2:(T+K) of the learning processing unit 115 differs from the actual data (e.g., the corresponding actual video frame x2:(T+K), and determine the accuracy of the prediction data 159 based thereon. For example, the result processing unit 119 may measure the degree of difference between the predicted data 159 and the actual data x2:(T+K) using at least one loss function "L2". The loss function "L2" may include a mean square error (MSE) function, and may be given as in Equation 1 below.

$$L_2(G) = \frac{1}{2}\sum_{i=2}^{T+K} \|x_i - \hat{x}_i\|^2 \quad \text{[Equation 1]}$$

When the aforementioned loss function "L2" is minimized, the prediction data 159 identical to or close to the actual data 151 (i.e., raw data) may be generated. According to the experiment, the learning result of the above-described learning processing unit 115 was found to minimize such a loss function "L2". That is, the processor 110 may generate a consistent video frame without additional loss correction. In addition, the result processing unit 119 may generate at least one additional piece of various data based on the prediction data 159 depending on a selection of a designer or a user.

In addition, according to an embodiment, the processor 110 may further perform calculation, determination, and control operations related to the overall driving of the video frame prediction apparatus 100, besides the above. For example, the processor 110 may control the interface 101, and thus the prediction data 159 obtained by the processor 110 may be transmitted to an external device or displayed to a user.

According to an embodiment, the processor 110 may drive a program (which may be referred to as an app, application, or software) stored in the storage unit 150 to perform an operation, determination, processing and/or control operation necessary for obtaining the aforementioned prediction data 159. The processor 110 may include a graphics processing unit (GPU), a central processing unit (CPU), a micro controller unit (MCU), a microprocessor (Micom), an application processor (AP), an electronic controlling unit (ECU), and/or other electronic devices capable of processing various calculations and generating control signals, and the like. These devices may be implemented using one or more semiconductor chips or the like.

The storage unit 150 may temporarily or non-temporarily store data 151 and 159 required for the operation of the processor 110 or acquired by the processor 110 and may provide the stored data 151 and 159 according to the control of the processor 110 or predefined settings to the processor 110 or the interface 101. For example, the storage unit 150 may store at least one raw data 151 acquired through the interface 101, and may provide the raw data 151 to the processor 110 based on a call of the processor 110, and/or may store the prediction data 159 obtained by the processor 110. In addition, the storage unit 150 may further store at least one learning model 120, the trained learning model 120*a* and/or at least one program implemented including one of them, to be used by the processor 110 to obtain the prediction data 159. Here, the learning models 120 and 120*a* or the program may be stored or modified in the storage unit 150 after the designer writes or inputs them using the interface 101, or may be obtained or updated through an electronic software distribution network accessible via a wired or wireless communication network. The trained learning model 120*a* may be trained by another information processing device and stored in the storage unit 150 through the interface 101 or the like. The storage unit 150 may be fixed or detachably mounted to the video frame prediction apparatus 100 according to an embodiment, and may include, for example, at least one of a main memory device and an auxiliary memory device. The main memory device may be implemented using a semiconductor storage medium such as ROM and/or RAM. The auxiliary storage device may be implemented using at least one storage medium capable of permanently or semi-permanently storing data, such as a flash memory device, a secure digital (SD) card, a solid state drive (SSD), a hard disk drive (HDD), a magnetic drum, a compact disc (CD), DVD or a laser disc.

The interface 101 may receive an instruction, command, data or program from a user and/or may output a processing result to the outside. For example, the interface 101 may receive the raw data 151 or the learning models 120 and 120*a* from the user or other information processing device (not shown), or may receive a command related to learning start from the user, and may visually output the prediction data 159 or the like obtained according to the learning process to the user, or may transmit it to another information processing device. The interface 101 may include at least one of an input unit and an output unit. The input unit may include, for example, a keyboard, a mouse, a tablet, a touch screen, a touch pad, a scanner, a video capturing module, a microphone, a track ball, and a track pad, a data input/output terminal capable of receiving data from an external device (memory device, etc.) and/or a communication module (e.g., LAN card, short-distance communication module, or mobile communication module, etc.) that is connected to an external device through a wired/wireless communication network. The output unit may include, for example, a display, a printer device, a speaker device, a video output terminal, a data input/output terminal, and/or a communication module, but is not limited thereto. The interface 101 may be provided integrally with the video frame prediction apparatus 100 or may be provided to be physically separable.

The above-described video frame prediction apparatus 100 may be implemented using one information processing device capable of processing data, or may be implemented by combining two or more information processing devices or data storage devices that are the same or different from each other. In the latter case, the two or more information processing apparatuses may be implemented using the same apparatus or may be implemented using different apparatuses. For example, the interface 101 of the video frame prediction apparatus 100 may be implemented using at least one terminal device (e.g., a desktop computer or a smart phone), and the processor 110 may be implemented by using another information processing device (e.g., a server computer, etc.) communicatively connected to at least one terminal device. Here, another information processing device may be provided to include the storage unit 150. The one or more information processing devices described above may include at least one device capable of arithmetic processing contemplated by a designer, for example, a desktop computer, a laptop computer, a server computer, a smart phone, a tablet PC, a navigation device, a portable game console, a smart watch, a head mounted Display (HMD) device, a digital television, a set-top box, home appliances (a refrigerator and a robot vacuum, etc.), artificial intelligence sound reproduction device (an artificial intelligence speaker), vehicles, manned aircraft, an unmanned aerial vehicle, a robot, or an industrial machine. However, the information processing apparatus usable as the video frame prediction apparatus 100 is not limited thereto, and various apparatuses may be used as the above-described video frame prediction apparatus 100 if necessary.

Hereinafter, the learning processing unit 115 will be described in more detail.

Figure 2:
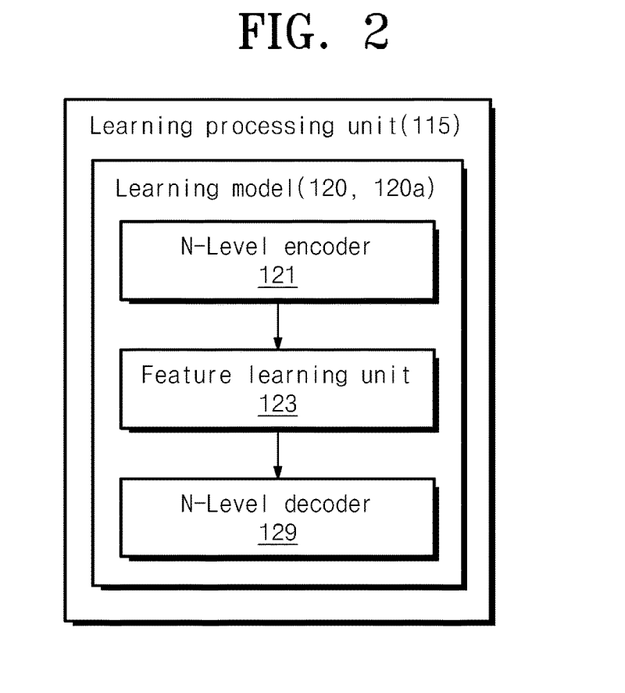
FIG. 2 is a block diagram of an embodiment of a learning processing unit.
Figure 3:
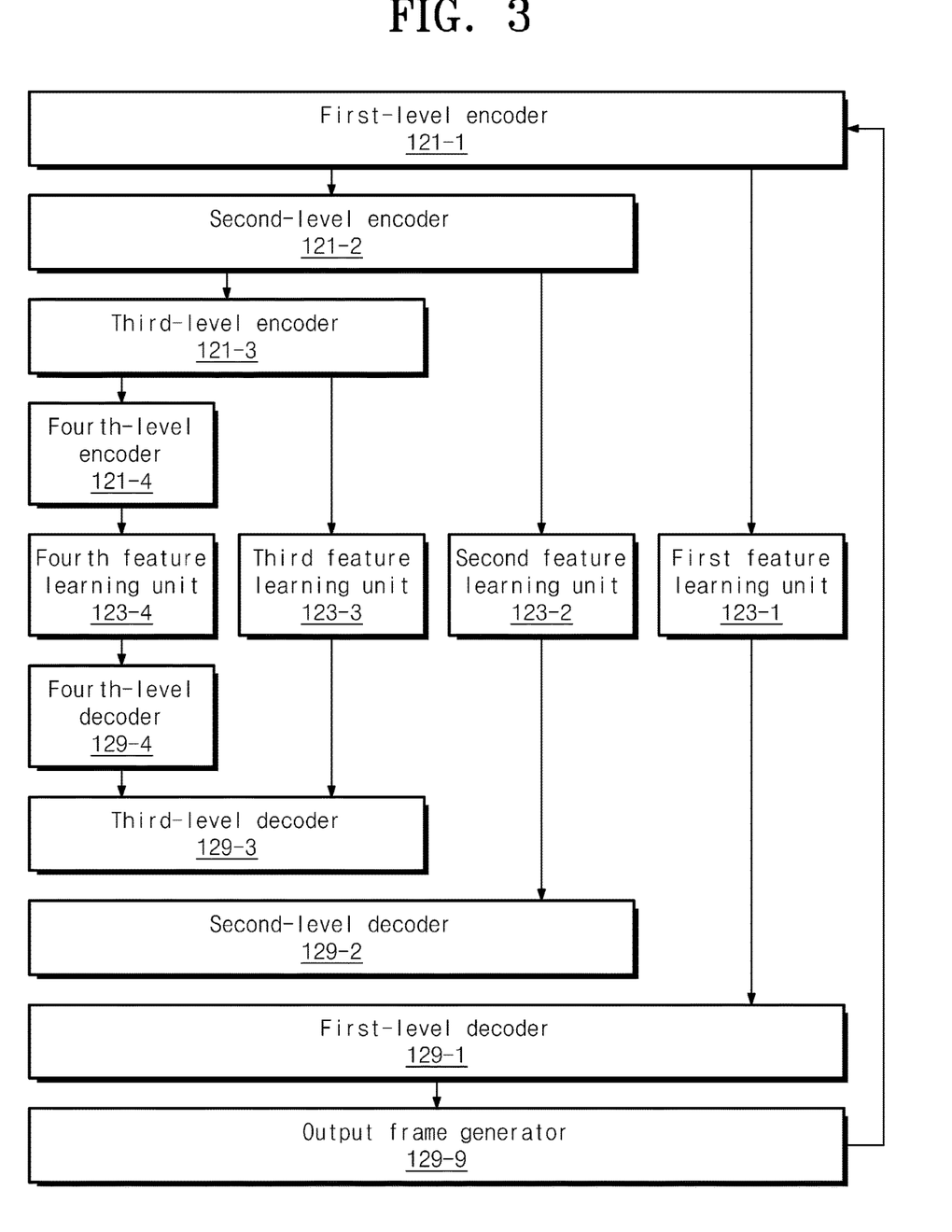
FIG. 3 is a view illustrating an example of a level.

FIG. 2 is a block diagram of an embodiment of a learning processing unit, and FIG. 3 is a view illustrating an example of a level.

As shown in FIG. 2, the learning processing unit 115 may perform training or prediction based on the learning models 120 and 120*a*, wherein the learning models 120 and 120*a* may be previously trained or not trained. In an embodiment, the learning models 120 and 120*a* may include an N-level encoder 121, a feature learning unit 123 connected to the N-level encoder 121, and an N-level decoder 129 connected to feature learning unit 123. Here, the N-level encoder 121, the feature learning unit 123, and the N-level decoder 129 may be provided to correspond to each other.

The N-level encoder 121 may extract a latent representation from the input raw data 151, that is, at least one video frame(s). The latent representation may be information that is potentially present in the video frame but is difficult for a human to derive manually, may be features that are self-learned through a deep learning neural network and help prediction and may include N levels ("N" is the number of encoder and decoder layers) of hierarchical feature(s). Here, the feature may include at least one piece of information about a subject or background necessary for prediction, such as a shape or movement (change in position, change in size, change in shape and/or change direction or rate of change, etc.) of a subject or background in at least one video frame (e.g., the video frame "xt" at a specific time point). The number of levels or the content of each level may be arbitrarily defined by a user or a designer. For example, a level may include four levels (e.g., N=4), such a as high-level, a mid-high-level, a mid-low-level, and a low-level, and thus, a high-level feature, a middle-high-level feature, a mid-lower-level feature, and a low-level feature may be extracted from the video frame "xt" input by the N-level encoder 121. Here, the higher-level features may make the prediction process simpler, and the lower-level features may be defined to make the predicted video frame more realistic. For example, the higher-level feature may be defined to indicate the identity of the object in the video frame "xt", the position or speed of the object, and the lower-level feature may be defined to represent a shape such as a circle or a boundary, or a detailed shape of a specific object. However, the number of the above-described level encoders 121-1 to 121-4 is not limited to 4. The number of these levels or the definition of the features of each level is exemplary, and the number of levels (i.e., the number of level encoders 121-1 to 121-4) may be 3 or less or 5 or more depending on the designer or user's selection, and correspondingly, the features of each level may also be defined in various ways depending on a designer or a user. The N-level encoder 121 may implement the accuracy of the prediction data 159 by extracting the latent feature from the video frame "xt" and using it for prediction. The level-specific features obtained by the N-level encoder 121 may be transmitted to each feature learning unit 123.

In detail, the N-level encoder 121, as shown in FIG. 3, may include at least one level of encoders 121-1 to 121-4, and may include a first-level encoder 121-1, a second-level encoder 121-2 connected to the first-level encoder 121-1, a third-level encoder 121-3 connected to the second-lever encoder 121-2, and a fourth-level encoder 121-4 connected to the third-level encoder 121-3. Each of the first to fourth-level encoders 121-1 to 121-4 may hierarchically extract features from the video frame "xt" of at least one time point. For example, the first-level encoder 121-1 may extract the high-level feature, the second-level encoder 121-2 may extract the mid-high-level feature, and the third-level encoder 121-3 may extract the mid-low level feature. Also, the fourth-level encoder 121-4 may extract a low-level feature. Accordingly, one or more data on the layered feature may be obtained. The feature(s) acquired by each of the N-level encoders 121-1 to 121-4 may be transmitted to the corresponding feature learning units 123-1 to 123-4. In other words, in the N-level encoders 121: 121-1 to 121-4, the video frame "xt" of at least one time point is compressed into a latent representation, and the latent representation is transmitted to the level decoder 129 through the feature learning unit 123.

According to an embodiment, the first-level encoder 121-1, the second-level encoder 121-2, the third-level encoder 121-3, and the fourth-level encoder 121-4 may all be built on the same learning model, some may be the same and some may be built on a different learning model, or they may all be built on a different learning model. Here, the learning model may include at least one learning model, such as a convolutional neural network (CNN), a deep neural network (DNN), a recurrent neural network (RNN), and/or a deep belief neural network (DBN).

The feature learning unit 123 may learn temporal dynamics of each feature of at least one level. The feature learning unit 123 may include at least one feature learning unit 123-1 to 123-4 separately provided for each level. The at least one feature learning unit 123-1 to 123-4 may be provided corresponding to the number of levels for each feature to be extracted. For example, if features are extracted through four levels as described above, the feature learning units 123 corresponds to the four feature learning units 123-1 to 123-4 may be included. In other words, when the four level encoders 121-1 to 121-4 are provided, the feature learning units 123 may include the first feature learning unit 123-1 corresponding to the first-level encoder 121-1, the second feature learning unit 123-2 corresponding to the second-level encoder 121-2, the third feature learning unit 123-3 corresponding to the third-level encoder 121-3, and the fourth feature learning unit 123-4 corresponding to the fourth-level encoder 121-4. Here, the number of the first to fourth feature learning units 123-1 to 123-4 is exemplary, and the feature learning unit 123 may include three or less feature learning units 123-1 to 124-3 according to an embodiment, or five or more feature learning units (not shown).

Based on the operation result of the feature learning unit 123, the number of predicted feature data corresponding to the number of levels may be output. In detail, the first feature learning unit 123-1 may output feature data predicted by estimating the high-level feature extracted by the first-level encoder 121-1, and the second feature learning unit 123-2 may output feature data predicted for the mid-high-level feature extracted by the second-level encoder 121-2. Also, in the same way, the third feature learning unit 123-3 may output feature data predicted for the mid-low-level feature extracted by the third-level encoder 121-3, and the fourth feature learning unit 123- may output feature data predicted for the low-level feature extracted by the fourth encoder 121-4.

According to an embodiment, each feature learning unit 123: 123-1 to 123-4 may be implemented using at least one learning model such as a long short term memory (LSTM), a deep neural network, a convolutional neural network, a recurrent neural network, a deep trust neural network, and a deep Q-network, a generative adversarial network (GAN), and/or a conditional adversarial network (cGAN). In this case, each of the feature learning units 123: 123-1 to 123-4 may be all built based on the same learning model, or some or all of them may be implemented based on different learning models. The predicted feature data obtained by the feature learning units 123: 123-1 to 123-4 may be transmitted to the N-level decoder 129. The N-level decoder 129 may obtain at least one prediction data 159 (i.e., the predicted video frame "^xt") based on the at least one layered data (i.e., at least one predicted feature data corresponding to at least one level of feature) obtained by the feature learning unit 123. For example, the N-level decoder 129 may receive a plurality of predicted feature data (e.g., four predicted feature data corresponding to the four feature learning units 123-1 to 123-4), and may obtain at least one predicted video frame "^xt" by combining and processing the received four predicted feature data. Here, the N-level decoder 129 may be provided to correspond to the N-level encoder 121. Accordingly, "N" of the N-level encoder 121 and the N-level decoder 129 may be the same value as each other. In detail, for example, referring to FIG. 3, the N-level decoder 129 may include a first-level decoder 129-1, a second-level decoder 129-2 connected to the first-level decoder 129-1, a third-level decoder 129-3 connected to the second-level decoder 129-2, and a fourth-level decoder 129-4 connected to the third-level decoder 129-3. Each of the decoders 129-1 to 129-4 Each of the decoders 129-1 to 129-4 may receive at least one predicted feature data simultaneously or sequentially from each of the feature learning units 123-1 to 123-4 corresponding to the respective decoders 129-1 to 129-4. For example, the first-level decoder 129-1 may receive predicted feature data from the first feature learning unit 123-1 connected to the first-level encoder 121-1, the second level decoder 129-2 may receive the predicted feature data from the second feature learning unit 123-2 connected to the second-level encoder 121-2, and the third-level decoder 129-3 may receive the predicted feature data from the third feature learning unit 123-3 connected to the third-level encoder 121-3. Also, the fourth-level decoder 129-4 may receive predicted feature data from the fourth feature learning unit 123-4 connected to the fourth-level encoder 121-4. Each of the first to fourth-level decoders 129-1 to 129-4 may obtain and output analysis and reconstruction results corresponding to the predicted feature data alone or in combination. The analysis and restoration results of each of the first to fourth-level decoders 129-1 to 129-4, depending on the situation or design, may be transmitted to the other level decoders 129-1 to 129-3 and/or the output frame generator 129-9, and/or may be input back to the N-level encoder 121 (e.g., the first-level encoder 121-1) and/or output to the outside.

According to an embodiment, the first-level decoder 129-1, the second-level decoder 129-2, the third-level decoder 129-3, and the fourth-level decoder 129-4 may be built using all the same learning model, some may be built using the same and some may be built using different learning models, or they may all be built using different learning models. In addition, each of the N-level decoders 129-1 to 129-4 may be constructed using the same learning model or a different learning model as the corresponding N-level encoders 121-1 to 121-4. Here, the learning model may include at least one of various learning models available as the N-level decoder 129, such as a convolutional neural network, a deep neural network, a recurrent neural network, and/or a deep trust neural network, according to an embodiment.

According to an embodiment, the N-level decoder 129 may further include an output frame generator 129-9. The output frame generator 129-9 may maintain the same size of the output video frame "^xt". For example, when the size of the video frame predicted by the plurality of level decoders 129-1 to 129-4 is different from the size of the input original video frame "xt", the output frame generator 129-9 may set the size of the predicted video frame "^xt" to be obtained by correcting the size of the predicted video frame to be the same as the size of the original input video frame "xt". The output frame generator 129-9 may be designed using at least one learning model or using a hidden layer of at least one learning model, according to an embodiment. For example, the output frame generator 129-9 may be implemented using a 1xi convolutional layer or the like. In addition, according to the designer's selection, the output frame generator 129-9 may be implemented using one or more learning models or hidden layers alone or in combination. The output result of the output frame generator 129-9 may be externally output depending on circumstances and/or may be fed back to the N-level encoder 121, for example, the first-level encoder 121-1.

Operations of the above-described N-level encoder 121, the feature learning unit 123, and the N-level decoder 129 may be expressed by Equations 2 to 4 below.

$$(F_t^1, F_t^2, F_t^4, F_t^4) = \text{Enc}(x_t) \quad \text{[Equation 2]}$$

$$(H_t^m, C_t^m) = \text{ConvLSTM}_m(F_t^m, C_{t-1}^m), m=1,2,3,4 \quad \text{[Equation 3]}$$

$$\hat{x}_{t+1} = \text{Dec}(H_t^1, H_t^2, H_t^3, H_t^4)$$

Here, "F^m_t" refers to the processing result (e.g., when the convolutional neural network is used as the m-th level encoder 121-m, the convolutional neural network features from the low-level to the high-level extracted by the m-th level encoder 121-m) of the m-th level encoder 121-m (m=1, 2, 3, 4, ... ) with respect to the input video frame "xt" at a specific time point "t". convLSTM_m refers to the m-th feature learning unit 123-m constructed using long-term memory, and H^m_t and C^m_t mean a hidden state and a cell state of the m-th feature learning unit 123-m for the video frame "xt" at a specific time point "t", respectively. Enc( ) and Dec( ) correspond to the N-level encoder 121 and the N-level decoder 129, respectively.

Figure 4:
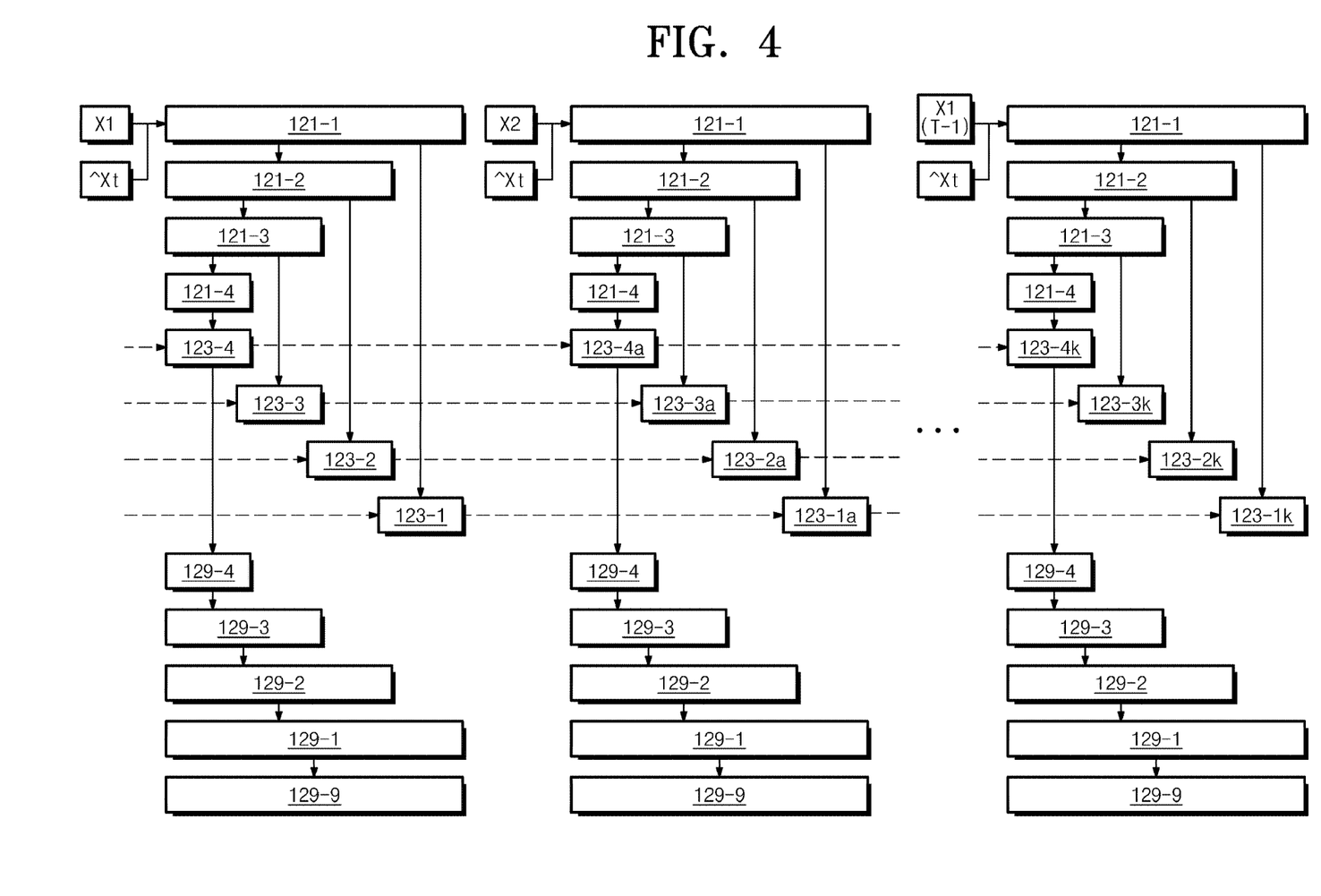
FIG. 4 is a diagram illustrating a training process of a learning processing unit.

FIG. 4 is a diagram illustrating a training process of a learning processing unit.

According to an embodiment, the learning processing unit 115, as shown in FIG. 4, may receive the raw data 151, e.g., video frames (x1 to x(T-1)) of the first to (T-1)th time points, arbitrarily or sequentially and may train the learning model (i.e., the N-level encoder 121, the feature learning unit 123, and/or the N-level decoder 129) based thereon. According to an embodiment, the learning processing unit 115 may receive past or present predicted data 159, for example, a predicted video frame "^xt". In this case, while training is being performed, the video frames of the first to (T-1)-th time points x1 to x(T-1) and at least one video frame x1 to x(T-1) or ^xt arbitrarily selected from the predicted video frame "^xt" may be input to the learning processing unit 115 for training. Selection of at least one of the correct answer video frame "xt" and the predicted video frame "^xt" may be performed based on a probability. In detail, for example, initially, by setting the probability to 0, video frames x1 to x(T-1) or ^xt are selected, and as the probability value is gradually increased depending on a fixed value or an arbitrary value at each repetition of training, at least one video frame x1 to x(T-1) or ^xt may be selected. Here, the selected video frame(s) x1 to x(T-1) or ^xt may be sequentially or arbitrarily input to the learning processing unit 115, respectively, and the learning processing unit may perform training using the input video frames x1 to x(T-1) or ^xt. In this way, when the first to (T-1)-th times or the predicted video frames x1 to x(T-1) or ^xt are selectively input, the learning processing unit 115 may gradually train the learning model to correct possible errors or mistakes, and thus the learning model has the advantage of being more robust to prediction errors.

When the video frame(s) x1 to x(T-1) and/or ^xt are input, the learning processing unit 115 may perform training using the N-level encoder 121, the feature learning unit 123, and the N-level decoder 129. In other words, when the video frames x1 to x(T-1) of the first to (T-1) times are input or at least one of the video frames x1 to x(T-1) and the predicted video frame "^xt" of the first to (T-1)-th times are selectively input, the training is performed through each level encoder 121-1 to 121-4, each feature learning unit 123-1 to 123-4, and each level decoder 129-1 to 129-4. The learning model 120 including the level encoders 121-1 to 121-4, the feature learning units 123-1 to 123-4, the level decoders 129-1 to 129-4, the output frame generating unit 129-9 may be repeatedly trained at least once according to a sequential or arbitrary input of each video frame x1 to x(T-1) or ^xt. For example, the learning model 120 is trained by the input of the video frame x1 at the first time point, and by receiving the feature values from the first to fourth feature learning units 123-1 to 123-4, training by the input of the video frame x2 at the second time is restarted in the same or partly different way. The trained learning model 120 is obtained based on repetition of such training. That is, the learning model 120 is trained by repeating the above process by sequential or arbitrary input of the video frames x1 to x(T-1) and/or "^xt". That is, whenever the video frame "xt" is input and passes through the learning model 120 consisting of the N-level encoder 121, the feature learning unit 123, the N-level decoder 129, and the output frame generator 129-9, the model is trained. Here, the first to fourth feature learning units 121-1a to 123-4a trained through any one training process (e.g., the first training process) may be designed to further utilize the latent representations obtained by the first to fourth feature learning units 121-1 to 123-4 in previous training. In other words, the latent representation obtained in training for the video frame x1 at the first time point may affect training for the video frame x2 at the second time point immediately following or training on video frames x2 to x(T−1) at some point in the future. Here, the previous training may include, for example, the training immediately preceding the first training with respect to the second training and include at least one previous training, according to an embodiment.

According to an embodiment, in the training process, the above-described result processing unit 119 may use the loss function "L2" to calculate and obtain an error between the predicted value "^xt" and the actual value "xt". The result processing unit 119 may transmit the calculation and the obtained error to the learning processing unit 115, and thus the learning processing unit 115 may reflect it in training, or may output it to the outside if necessary.

Figure 5:
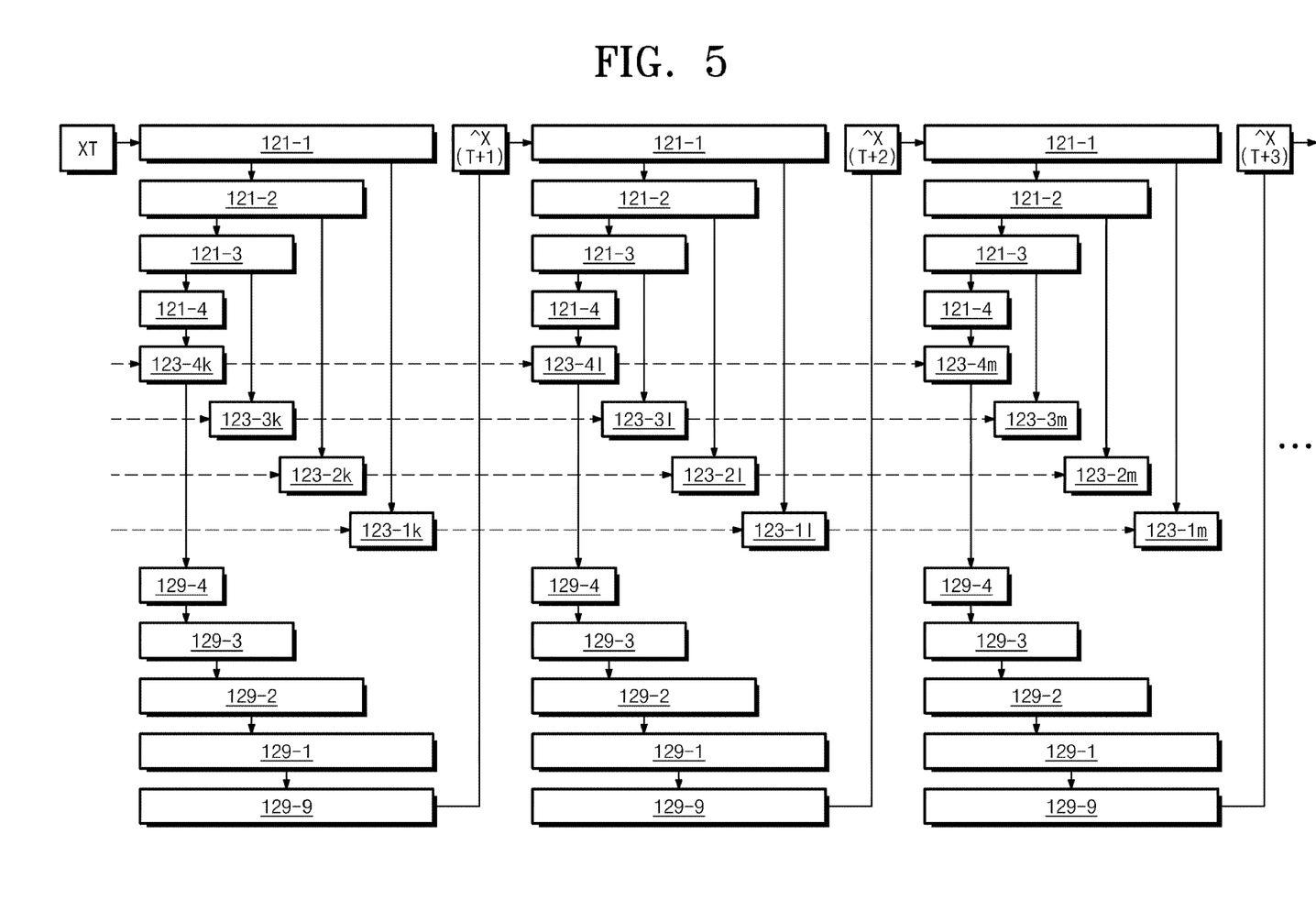
FIG. 5 is a diagram for explaining a prediction process of a learning processing unit.

FIG. 5 is a diagram for explaining a prediction process of a learning processing unit.

According to an embodiment, the learning processing unit 115 may perform prediction on the predicted video frames ^x(T+1) to ^x(T+3), as shown in FIG. 5. Here, the predicted video frames ^x(T+1) to ^x(T+3) may include a video frame that will appear at a time point (T+1) to (T+3) after at least one time point "T". In detail, when the video frame "xT" at time "T" is input to the learning processing unit 115, as described above, the first level encoder to the fourth level encoder 121-1 to 121-4 may extract features corresponding to each level from the video frame "xT" and may transmit them to the first to fourth feature learning units 123-1k to 123-4k, respectively. Each of the first to fourth feature learning units 123-1k to 123-4k may obtain predicted feature data corresponding to the transmitted features and may transmit the predicted feature data to the corresponding first to fourth level decoders 129-1 to 129-4. The first to fourth level decoders 129-1 to 129-4 and the output frame generator 129-9 obtains a predicted video frame ^x(T+1) for the (T+1)-th time point based on the predicted feature data. The obtained predicted video frame ^x(T+1) may be transferred to and stored in the storage 150. In addition, according to an embodiment, the obtained predicted video frame ^x(T+1) may be input to the first level encoder to the fourth level encoder 121-1 to 121-4 again, and same first-level encoder to four-level encoder 121-1 to 121-4 trained above may extract features corresponding to each level from the input predicted video frame ^x(T+1) in the same manner as described above, and may transmit it to the trained first to fourth feature learning units 123-11 to 123-41. As described above, the features obtained by each of the first to fourth-level encoders 121-1 to 121-4 may be transmitted to the corresponding first to fourth feature learning units 123-11 to 123-41. The trained first to fourth feature learning units 123-11 to 123-41 may obtain predicted feature data in response thereto, respectively, and the predicted feature data may be transmitted to the trained first to fourth-level decoders 129-1 to 129-4. The first to fourth-level decoders 129-1 to 129-4 and the output frame generation unit 129-9 may obtain a predicted video frame ^x(T+2) for the (T+2)-th time point based on the predicted feature data. As described above, similarly, the predicted video frame ^x(T+2) for the (T+2)-th time point may be stored in the storage 150, and may be re-input to the first to fourth level encoders 121-1 to 121-4. Additionally, as performing operating as described above, the first to fourth feature learning units 123-1m to 123-4m, the first to fourth-level decoders 129-1 to 129-4, and the output frame generating unit 129-9 may obtain a predicted video frame ^x(T+3) for the (T+3) for the (T+3)-th time point. The process may be continuously repeated, and may be terminated with or without additional model training depending on conditions set by a user or a designer. Here, the conditions set by the user or the designer may include whether a video frame ^x(T+K) for a specific time point (T+K) is acquired, whether a specific point in time (T+K+1) has arrived, whether to perform a predetermined number of predictions, elapse of predefined time. As a result, a predicted video frame ^x(T+1) for a time point (T+1) to a predicted video frame ^x(T+K) for a time point (T+K) are generated. Accordingly, it is possible to obtain at least one video frame ^x(T+1) to ^x(T+K) corresponding to a desired time point or period in the future.

Hereinafter, an embodiment of a method for predicting a video frame will be described with reference to FIGS. 6 to 8.

Figure 6:
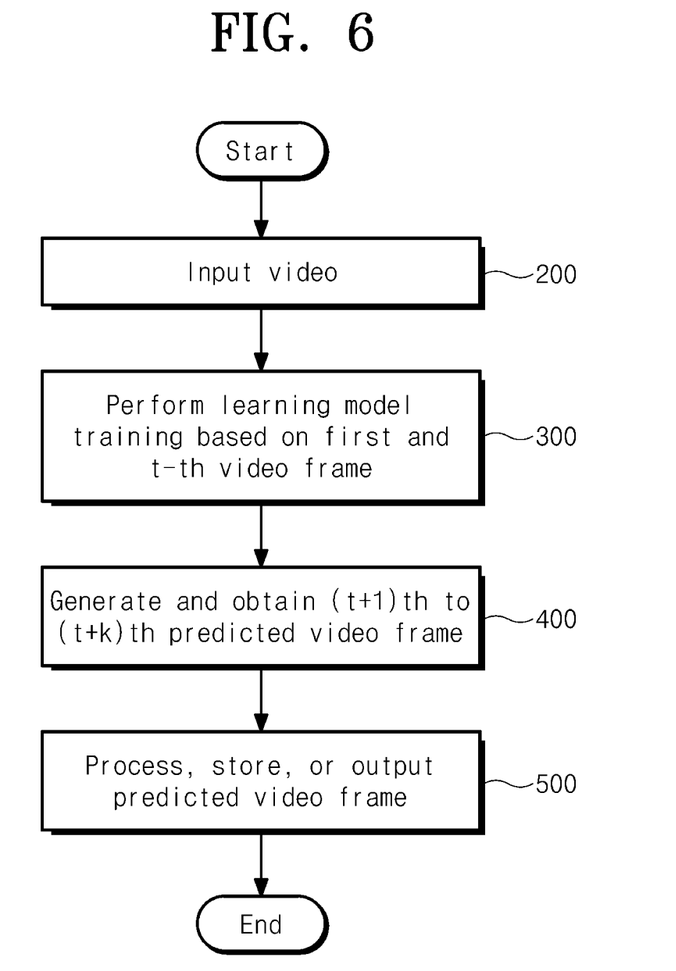
FIG. 6 is a flowchart of an embodiment of a method for predicting a video frame.

FIG. 6 is a flowchart of an embodiment of a method for predicting a video frame.

As shown in FIG. 6, first, at least one video may be input to the video frame prediction apparatus through a data input/output terminal, a disk reader, a card reader, and/or a communication module in 200. Each of the at least one video may include at least one video frame, for example, first to T-th video frames, and the at least one video frame is sequentially connected to form at least one video. The video frame consists of a combination of a plurality of pixels. Predetermined information (e.g., RGB values) is mapped to each pixel, and accordingly, when the video frame is displayed through a display device, at least one subject or background appears on the screen. The input video may be temporarily or non-temporarily stored in a storage unit, such as a main memory device or an auxiliary memory device, if necessary.

When a video is input, a learning model may be trained based on the first to T-th video frames in the video, immediately or after a certain time has elapsed according to the user or designer's preset, or according to the operation of the user's input unit in 300. Accordingly, a trained learning model is obtained. Here, the learning model including N level encoders (i.e., N-level encoders, "N" is a natural number greater than or equal to 1), N feature learning units corresponding to each of the N level encoders, and N level encoders and N feature learning units. The corresponding N level decoders (i.e., N-level decoders, which may further include an output frame generator if necessary) may be provided. Here, the N-level encoder and the N-level decoder may be implemented using the same or different neural networks, where the neural network is, for example, a convolutional neural network, a deep neural network, a recurrent neural network, a long-term memory and/or a deep trust neural network or the like. In addition, the feature learning unit may also be implemented using a neural network that is different from both the N-level encoder and the N-level decoder or the same as at least one of the N-level encoder and the N-level decoder, and may be implemented with, for example, a long-term memory.

Based on the trained learning model, future video frames (i.e., predicted video frames, e.g., (T+1)th to (T+K)th video frames) may be generated and obtained in 400. In detail, the last video frame (i.e., the T-th video frame) of the first to T-th video frames used for training may be input to the trained learning model to obtain the (T+1)-th to (T+K)-th video frames subsequent to the T-th video frame. Acquisition of the predicted video frame may be performed by the same information processing device as the information processing device that has performed learning, or may be performed by an information processing device different from the information processing device that has performed learning. Here, the different information processing devices may be connected to the learned information processing device through a wired/wireless communication network.

When the predicted video frame is generated and obtained, the obtained predicted video frame may be stored or may be visually and/or aurally output to the outside in 500. If necessary, the predicted video frames may be sequentially combined based on the reproduction order to form at least one video, and then the formed video may be output or stored. The output or storage of the predicted video frame may be performed in real time. That is, each of the (T+1)th to (T+K)th video frames may be stored in the storage unit and/or output to the outside whenever they are predicted and generated.

Hereinafter, each of the training process 300 and the predicted video frame generating process 400 of the above-described learning model will be described in more detail.

Figure 7:
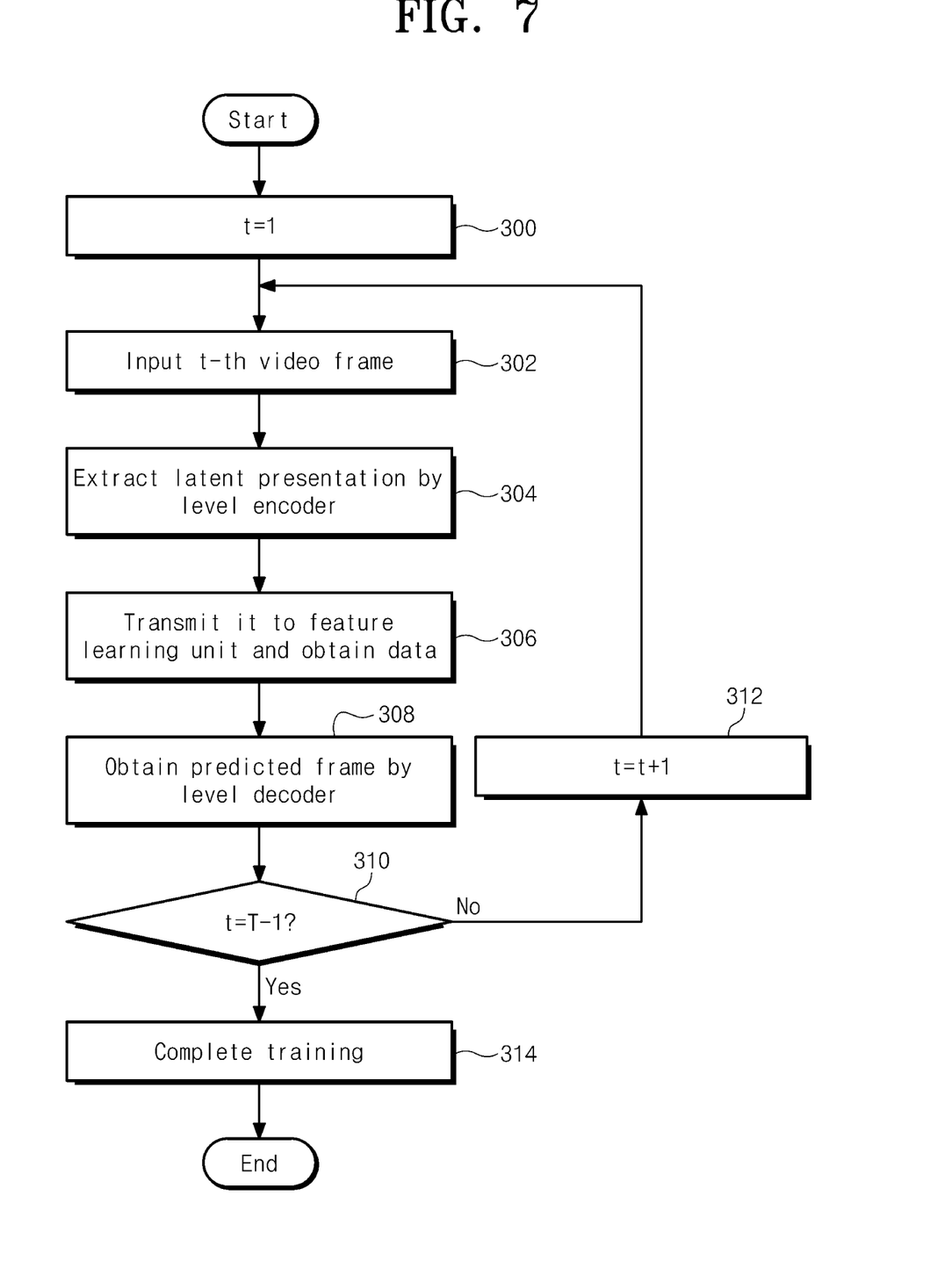
FIG. 7 is a flowchart of an embodiment of a process for training a learning model.

FIG. 7 is a flowchart of an embodiment of a process for training a learning model.

Referring to FIG. 7, first, a video frame (i.e., a first video frame) at a first time point (t=1) may be input to the learning model in 300 and 302.

The level encoder of the learning model may extract latent representations from the input first video frame, and more specifically, may extract features of at least one different level from each other in 304. For example, the level encoder may include first to N-th level encoders, and the first to N-th level encoders may extract features of the first to N-th level, respectively. The extracted first to N-th level features may be hierarchical to each other. The number of level encoders may be provided equal to the number of levels of features to be extracted.

The feature learning unit may include first to N-th feature learning units corresponding to the number of level encoders. Each of the first to N-th feature learning units may receive the extracted features, may model a temporal motion for each level feature, and may obtain predicted feature data in 306. In addition, the first to N-th feature learning units may be trained by the features of each level in the process of obtaining the predicted feature data.

The level decoder may receive the predicted feature data from the feature learning unit, and may obtain at least one piece of prediction data (i.e., a predicted video frame) based on the at least one piece of predicted feature data in 308. The level decoder may include first to N-th level decoders corresponding to the number of level encoders and/or the number of feature learning units. Each of the first to N-th level decoders may receive the predicted feature data transmitted from each of the first to N-th feature learning units, and may perform processing thereon to obtain predicted data corresponding to each level feature. Data corresponding to each level feature may be sequentially or simultaneously combined by a level decoder, and as a result, a predicted video frame may be obtained. The output frame generator of the level decoder may obtain a final predicted video frame by correcting the size of the predicted video frame depending on the processing results of the first to N-th level decoders.

The above-described processes of 302 to 308 may be repeated at least once, for example, may be repeated for (T−1) times set by a designer or a user in 310 and 312. That is, after the first video frame is input and learning and training are performed through the above-described processes of 304 to 308 based thereon, if T is 3 or more, the second video frame may be input again in 312 and 302 and learning may be performed on the second video frame in the same manner as in the above-described processes of 304 to 308.

If training is performed in 304 to 308 using a predetermined video frame, for example, the (T−1)th video frame depending on a preset selection or setting, the training is completed in S314. The trained learning model may be stored in the storage unit, and may be transmitted to another video frame prediction device through a communication module or data input/output terminal if necessary, or may be output to a user through a display.

Figure 8:
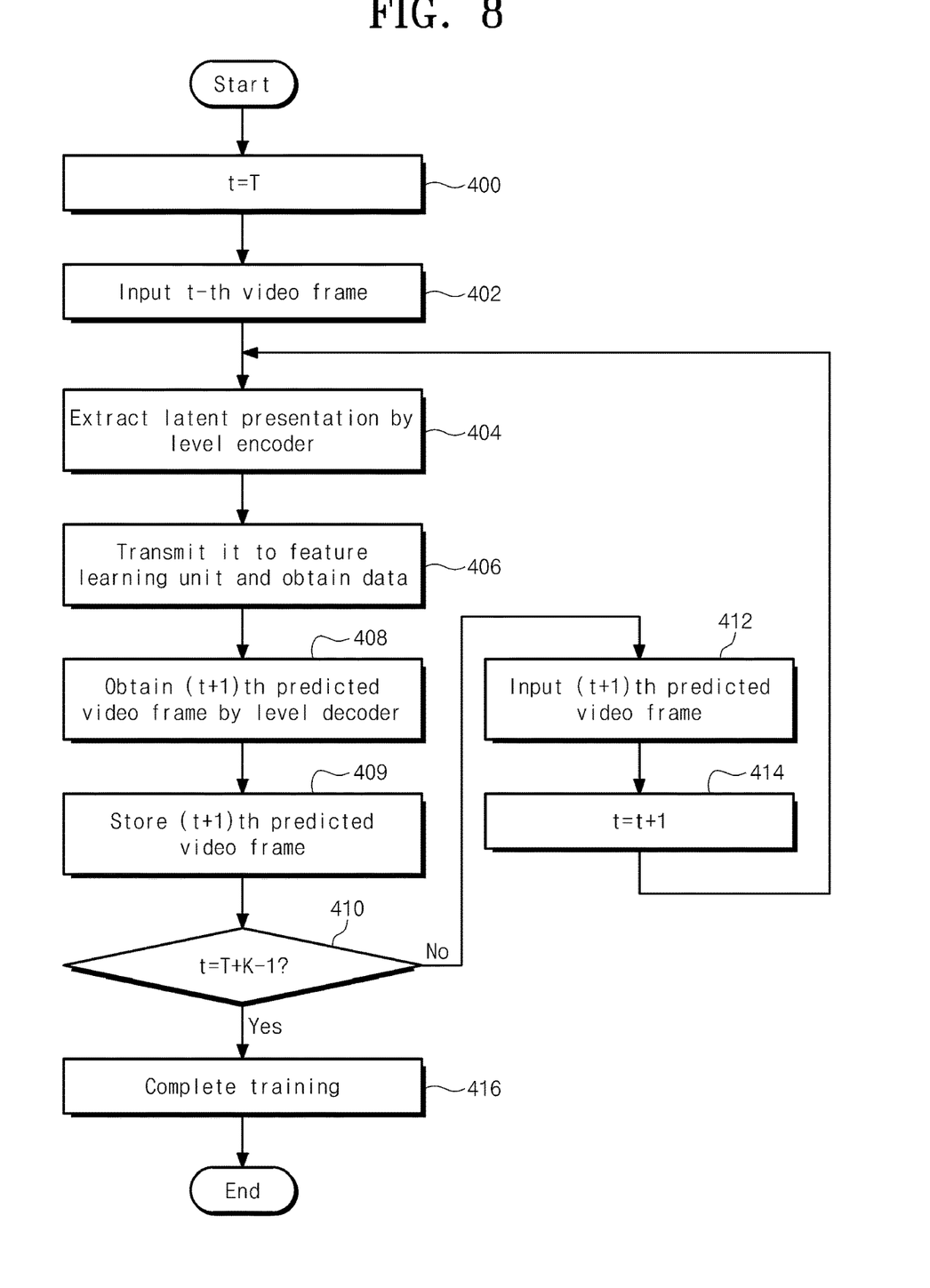
FIG. 8 is a flowchart of an embodiment of a process of predicting a video frame based on a learning model.

FIG. 8 is a flowchart of an embodiment of a process of predicting a video frame based on a learning model.

According to an embodiment of the process of predicting the video frame shown in FIG. 8, the video frame at the T-th time, that is, the T-th video frame, may be input to the trained learning model in 400 and 402. The input of the T-th video frame may be performed immediately after the (T−1)-th video frame of FIG. 7 is input, or may be performed after a predetermined time has elapsed. The trained learning model may be trained through the processes of 300 to 314 described with reference to FIG. 7, and may be obtained from a storage unit of the same device or from another information processing device external to the training model.

When the T-th video frame is input, the level encoder may extract a latent representation by obtaining features based on the level for the T-th video frame in 404. As mentioned above, the level encoder may include N level encoders, and each level encoder may extract a feature corresponding to each level encoder. Accordingly, features of N levels are extracted.

Sequentially, the feature learning unit obtains predicted feature data based on the feature according to the level in 406. The feature learning unit may also include N feature learning units corresponding to the N level encoders, and each feature learning unit may obtain predicted feature data corresponding to features of different levels.

The level decoder may obtain at least one predicted feature data corresponding to each feature of a different level from the feature learning unit, and may obtain a predicted video frame based thereon in 408. In detail, the level decoder may include N level decoders corresponding to the N level encoders and/or N feature learning units, and each level decoder may obtain an analysis and restoration result corresponding to the predicted feature data based on the predicted feature data for different levels, and may obtain a (T+1)th predicted video frame based thereon. Also, the level decoder may appropriately correct the (T+1)th predicted video frame through the output frame generator.

The obtained (T+1)th predicted video frame may be temporarily or non-temporarily stored in a main memory or an auxiliary memory in 409.

The above-described processes of 404 to 409 may be repeated until a predetermined predicted video frame, that is, a (T+K)th predicted video frame, is obtained according to a predefined rule in 410 to 414. Specifically, for example, when "K" is given as 2 or more by a user or a designer, "T" is less than (T+1) (No in 410), and thus (T+1)th predicted video frame is again input to the level encoder of the learning model in 412. Then, as the iterative execution of the above-described processes of 404 to 409, the (T+2)th predicted video frame is obtained and stored in 414, 406 to 409. By repeating those processes, a (T+K)th predicted video frame may be finally obtained and stored, and as a result, a total of K predicted video frames (i.e., (T+1)th to (T+K)th predicted video frames) may be sequentially obtained.

When the predicted video frame up to the desired time point, that is, the (T+K)th predicted video frame is obtained and stored (Yes in 410), the prediction process of the video frame may be completed in response thereto in 416. The obtained at least one predicted video frame (e.g., (T+1)th to (T+K)th predicted video frames) may be separately stored, processed, and/or transmitted or output as described with reference to FIG. 6 in 500.

The video frame prediction method according to the above-described embodiment may be implemented in the form of a program that is capable of being driven by a computer device. Here, the program may include program instructions, data files, and data structures alone or in combination. The program may be designed and manufactured using machine code or high-level language code. The program may be specially designed to implement the above-described method, or may be implemented using various functions or definitions that are known and available to those skilled in the art of computer software. Also, here, the computer device may be implemented including a processor or memory that enables the function of the program to be realized, and may further include a communication device if necessary.

A program for implementing the above-described video frame prediction method may be recorded in a computer-readable recording medium. The computer-readable recording medium may include, for example, a semiconductor storage device such as solid state drive (SSD), ROM, RAM, or flash memory, a magnetic disk storage medium such as hard disk or floppy disk, an optical recording medium such as compact disc or DVD, a magneto-optical recording medium such as a floppy disk, and at least one type of physical device capable of storing a specific program executed in response to a computer call.

The above-described apparatus for predicting a video frame or a method for predicting the video frame may be applied and used in various fields. For example, the above-described apparatus or method may be used in the field of video streaming technology, video compression or restoration technology, or video production field, and may be used to predict the motion of a subject (human or animal) in the video-based recognition/input device. In addition, the above-described apparatus or method for predicting the video frame may be used for autonomous driving control of a vehicle, for example, to predict a road condition in front of an autonomous driving vehicle or whether there is a collision between vehicles. In addition, the above-described apparatus or method for predicting the video frame may be used for tracking an object of interest, for example, may be used for forecasting the weather, such as predicting the movement direction of fine dust, typhoons or clouds, and be used for analyzing medical videos, predicting the progression of lesions, and predicting changes in a patient's condition, and may be used to predict changes in economic indicators, such as gross national product, or changes in stocks or interest rates. In addition, the above-described apparatus for predicting the video frame or method for predicting the video frame may be used in various technical fields that require estimation and prediction of a future video based on an existing video.

Although various embodiments of the apparatus for predicting the video frame and the method for predicting the video frame have been described above, the apparatus for predicting the video frame and method for predicting the video frame are not limited to the above-described embodiments. Various devices or methods that can be implemented by those skilled in the art by modification and revision based on the above-described embodiments may also be examples of the above-described apparatus and method for predicting the video frame. For example, even if the described techniques are performed in an order different from the described method, and/or the described components of the system, structure, apparatus, and circuit are combined or mixed in a different form than the described method or substituted by other components or equivalents, it may be an embodiment of the above-described apparatus for predicting the video frame and the method for predicting the video frame.

According to the above-described apparatus and method for predicting the video frame, it is possible to obtain the effect of enabling more accurate, clear and realistic video frame prediction.

In addition, in video prediction, the effect that the device may automatically learn about the layer-by-layer representation of the input frame passed through the neural network may be obtained.

In addition, it is possible to obtain the advantage of automatically performing learning of latent features or presentations of the video frames required for prediction through the encoders, decoders and feature learning units of multiple layers.

In addition, it is possible to perform high-quality video prediction even with relatively few learning parameters, and accordingly, it is possible to obtain an effect of reducing used computer resources or prediction time.

In addition, according to the above-described apparatus and method for predicting the video frame, the video prediction may be performed excellently not only on high-level features such as speed changes of objects in the video, but also on low-level features such as values for each pixel of the video.

What is claimed is:

1. An apparatus for predicting a video frame, the apparatus comprising:
   a level encoder configured to extract and learn at least one feature from a video frame;
   a feature learning unit configured to learn based on the at least one feature or transmit predicted feature data corresponding to the at least one feature; and
   a level decoder configured to obtain and learn a predicted video frame based on the predicted feature data,
   wherein the level encoder receives first to (T−1)th video frames, respectively, and extracts at least one feature from each of the first to (T−1)th video frames, where "T" includes a natural number equal to or greater than 2,
   wherein the feature learning unit is trained based on at least one feature extracted from each of the first to (T−1)th video frames,
   wherein the level encoder receives the T-th video frame,
   wherein the level decoder obtains a (T+1)th predicted video frame corresponding to the T th video frame,
   wherein the level encoder receives the (T+1)th predicted video frame, and
   wherein the level decoder obtains a (T+2)th predicted video frame corresponding to the (T+1)th predicted video frame.

2. The apparatus of claim 1, wherein the level encoder includes a first-level encoder to an N-th level encoder, and
   wherein each of the first-level encoder to the N-th level encoder extracts features of different levels from the video frame where "N" is a natural number equal to or greater than 2.

3. The apparatus of claim 2, wherein the feature learning unit includes a first feature learning unit to an N-th feature learning unit corresponding to each of the first-level encoder to the N-th level encoder, and wherein each of the first feature learning unit to the N-th feature learning unit receives each feature of the different levels, obtains and transmit predicted feature data corresponding to each feature of the different levels.

4. The apparatus of claim 3, wherein the level decoder includes a first-level decoder to an N-th level decoder corresponding to each of the first-level encoder to the N-th level encoder or corresponding to each of the first feature learning unit to the N-th feature learning unit, and wherein the first-level decoder to the N-th level decoder receive each of the predicted feature data, respectively, and generate a predicted video frame by using the predicted feature data.

5. The apparatus of claim 1, wherein at least one of the level encoder and the level decoder is based on at least one of a convolutional neural network (CNN), a deep neural network (DNN), a recurrent neural network (RNN), and a deep belief neural network (DBN).

6. The apparatus of claim 1, wherein the feature learning unit is based on a long short term memory (LSTM).

7. A method of predicting a video frame, the method comprising:

extracting at least one feature from a video frame;
obtaining predicted feature data trained based on the at least one feature or corresponding to the at least one feature; and
obtaining a predicted video frame based on the predicted feature data,
wherein the extracting of the at least one feature from the video frame includes:
receiving first to (T−1)th video frames, respectively, and extracting at least one feature from each of the first to (T−1)th video frames, where "T" includes a natural number of 2 or more,
wherein the training based on the at least one feature includes:
training based on at least one feature extracted from each of the first to (T−1)th video frames,
wherein the extracting of the at least one feature from the video frame includes:
receiving a T-th video frame and extracting at least one feature from the T-th video frame,
wherein the obtaining of the predicted video frame based on the predicted feature data includes:
obtaining a (T+1)th predicted video frame corresponding to the T th video frame based on the predicted feature data.

8. The method of claim 7, wherein the extracting of the at least one feature from the video frame includes:

extracting, by the first-level encoder to the N-th level encoder, features of different levels from each other from the video frame, where "N" includes a natural number equal to or greater than 2.

9. The method of claim 8, wherein the obtaining of the predicted feature data corresponding to the at least one feature includes:

receiving, by a first feature learning unit to an N-th feature learning unit corresponding to the first-level encoder to the N-th level encoder, the features of the different levels, respectively; and
obtaining, by the first feature learning unit to the N-th feature learning unit, the predicted feature data corresponding to each of the features of the different levels, respectively, and transmitting the predicted feature data to a next frame processing process.

10. The method of claim 9, wherein the obtaining of the predicted video frame based on the predicted feature data includes:

receiving each of the predicted feature data by a first-level decoder to an N-th level decoder, respectively; and
generating, by the first-level decoder to the N-th level decoder, the predicted video frame by using the predicted feature data, and
wherein the first-level decoder to the N-th level decoder correspond to each of the first-level encoder to the N-th level encoder, or corresponding to each of the first feature learning unit to the N-th feature learning unit.

11. The method of claim 7, further comprising:

receiving the (T+1)th predicted video frame and obtaining a (T+2)th predicted video frame corresponding to the (T+1)th predicted video frame.

12. A method of predicting a video frame, the method comprising:

extracting at least one feature from a video frame;
obtaining predicted feature data trained based on the at least one feature or corresponding to the at least one feature; and
obtaining a predicted video frame based on the predicted feature data,
wherein the extracting of the at least one feature from the video frame includes:
receiving first to (T−1)th video frames, respectively, and extracting at least one feature from each of the first to (T−1)th video frames, where "T" includes a natural number of 2 or more, and
wherein the training based on the at least one feature includes:
training based on at least one feature extracted from each of the first to (T−1)th video frames,
wherein the extracting of the at least one feature from the video frame includes:
extracting, by the first-level encoder to the N-th level encoder, features of different levels from each other from the video frame, where "N" includes a natural number equal to or greater than 2,
wherein the obtaining of the predicted feature data corresponding to the at least one feature includes:
receiving, by a first feature learning unit to an N-th feature learning unit corresponding to the first-level encoder to the N-th level encoder, the features of the different levels, respectively; and
obtaining, by the first feature learning unit to the N-th feature learning unit, the predicted feature data corresponding to each of the features of the different levels, respectively, and transmitting the predicted feature data to a next frame processing process, and
wherein the obtaining of the predicted video frame based on the predicted feature data includes:
receiving each of the predicted feature data by a first-level decoder to an N-th level decoder, respectively; and
generating, by the first-level decoder to the N-th level decoder, the predicted video frame by using the predicted feature data, and
wherein the first-level decoder to the N-th level decoder correspond to each of the first-level encoder to the N-th level encoder, or corresponding to each of the first feature learning unit to the N-th feature learning unit.

* * * * *